United States Patent [19]

Wood, Jr.

[11] Patent Number: 4,712,940
[45] Date of Patent: Dec. 15, 1987

[54] JOINT ASSEMBLY

[75] Inventor: Ruey E. Wood, Jr., St. Clair Shores, Mich.

[73] Assignee: TRW Inc., Cleveland, Ohio

[21] Appl. No.: 815,675

[22] Filed: Jan. 2, 1986

Related U.S. Application Data

[63] Continuation of Ser. No. 726,135, Apr. 23, 1985, abandoned.

[51] Int. Cl.$^4$ .................................................. F16C 3/00
[52] U.S. Cl. ..................................... 403/133; 403/122
[58] Field of Search ................ 403/132, 133, 135, 122

[56] References Cited

U.S. PATENT DOCUMENTS

| | | | |
|---|---|---|---|
| 2,292,676 | 8/1942 | Thiry | 403/133 |
| 2,305,881 | 12/1942 | Leighton . | |
| 2,871,025 | 1/1959 | Neher | 403/133 X |
| 2,954,992 | 10/1960 | Baker . | |
| 2,979,353 | 4/1961 | Sellers, Jr. . | |
| 3,210,106 | 10/1965 | Herbenar . | |
| 3,226,142 | 12/1965 | Herbenar . | |
| 3,501,184 | 3/1970 | Van Winsen et al. | 403/133 |
| 3,843,272 | 10/1974 | Jorn . | |
| 4,235,558 | 11/1980 | Snyder et al. . | |

FOREIGN PATENT DOCUMENTS 917062  1/1963  United Kingdom .
1260144 1/1972  United Kingdom ................ 403/135

Primary Examiner—Andrew V. Kundrat
Attorney, Agent, or Firm—Tarolli, Sundheim & Covell

[57] ABSTRACT

A ball and socket joint is used between members which pivot relative to each other. The joint includes a ball stud for connection with one member and a socket for connection with the other member. The ball stud has a ball portion and a shank portion projecting from the ball portion. The socket has a chamber in which the ball portion is located and an opening through which the shank portion projects. A cup-shaped bearing liner is interposed between a first part of the ball portion and the socket for transmitting forces and enabling sliding movement to occur therebetween. An elastomeric layer is bonded to a second part of the ball portion and resiliently interconnects the ball stud and socket and urges the ball stud and socket to initial relative positions when they are moved therefrom. The elastomeric layer has portions which project into volumes defined by the socket to mechanically interlock the elastomeric layer and socket and block slipping of the elastomeric layer relative to the socket.

9 Claims, 2 Drawing Figures

JOINT ASSEMBLY

This application is a continuation of application Ser. No. 726,135 filed Apr. 23, 1985 now abandoned.

The present invention relates to a ball and socket joint and more particularly to a ball joint having a socket, a ball stud and an elastomeric layer bonded to the ball portion of the ball stud.

BACKGROUND OF THE INVENTION

Ball and socket joints are known structures which are commonly used between load transmitting members which must move relative to each other. Typically, ball and socket joints include a ball-ended stud for connection with one of the relatively movable members and a socket which is connected with the other of the relatively movable members. The ball stud includes a ball portion which is located in a chamber defined by the socket. A bearing arrangement is provided between the ball portion of the ball stud and the socket to transmit forces between the ball stud and the socket and to permit relative movement between the ball stud and the socket.

One type of such bearing arrangement comprises bearing elements located in the socket and which have bearing surfaces on which the ball portion of the ball stud slides. Such constructions are susceptible to moisture, dirt, salt and other forms of contamination, reducing the life of the ball joint. Boot seals packed with grease are frequently used with such joints in order to provide for protection of the bearing surfaces.

Another type of bearing arrangement which is known is shown in U.S. Pat. Nos. 2,979,353; 3,843,272; and 4,235,558. These patents disclose ball joints having an elastomeric bearing material located between the ball portion of the ball stud and the socket. In these structures, the elastomeric material is bonded to the ball portion of the ball stud. The elastomeric material is interposed between the ball stud and the socket and resiliently interconnects the ball stud and the socket. The elastomeric material deforms resiliently during relative movement between the ball stud and socket. Because of the resilient deformation of the elastomeric material, it urges the ball stud and socket back to an original relative position after the ball stud and socket are moved by forces relatively from such original relative positions.

The ball joints which use an elastomeric material between the ball stud and socket are subject to certain problems. One problem is that the elastomeric material may slip in the socket upon relative rotation of the ball stud and the socket. This slippage, if it occurs, results in the ball stud and socket not returning to the original relative position. One technique for minimizing the possibility of slippage of the elastomeric material has been to bond the elastomeric material to the socket. Such technique is disclosed in U.S. Pat. No. 3,843,272. The bonding process, however, is relatively expensive. Another technique has been to substantially compress or preload the elastomeric material between the ball and the socket. This causes the elastomeric material to be wedged tightly against the surfaces of the socket. This technique has resulted in a problem that may be referred to as "excess torque hysteresis". Specifically, the deformation creates significant compressive stresses internally of the elastomeric bearing. When such a ball stud and socket are relatively pivoted, a portion of the elastomeric material which is deformed during assembly will be moved in opposition to the compressive stresses and, depending on the amount of movement between the ball stud and socket, may be placed in tension. When the forces causing the relative movement of the ball stud and socket are removed, the elastomeric material will not, because of the initial internal compressive stress, return to its original position, and therefore, the ball stud and socket will not be returned to their original relative positions.

Also, ball joints using elastomeric bearing material typically have the elastomeric material almost totally surrounding the ball portion of the ball stud. For example, this construction is shown in U.S. Pat. No. 4,235,558. When the elastomeric material totally surrounds the ball portion of the ball stud, relative pivoting movement between the ball stud and the socket results in a large volume of elastomeric material being distorted or deformed. As a result, there is a relatively high effort required to effect relative pivotal movement of the ball stud and socket as compared to a joint using the same elastomeric material not totally surrounding the ball portion.

SUMMARY OF THE PRESENT INVENTION

The present invention is directed to a ball and socket joint. Specifically, the present invention is directed to a ball joint having an elastomeric bearing layer bonded to the ball portion of the ball stud. This eliminates the need for boot seals or any other special sealing provisions as aforementioned. In addition, the ball joint of the present invention is constructed to minimize the aforedescribed "excess torque hysteresis" problem.

A ball joint of the present invention has an elastomeric layer bonded to a first part of the ball portion of the ball stud. The elastomeric layer is interposed between the ball stud and socket. A polymeric bearing liner is interposed between a second part of the ball portion of the ball stud and the socket.

Further in accordance with the present invention, the elastomeric material is bonded to the ball portion of the ball stud, but is neither bonded to the socket nor deformed (preloaded) substantially between the ball stud and socket to prevent or minimize slipping of the elastomeric material in the socket. In accordance with the present invention, the elastomeric material is prevented from slipping in the socket by portions of the elastomeric material which project into spaces or volumes of the socket to mechanically interlock the socket and the elastomeric material. This mechanical interlock avoids the expense of bonding the elastomeric material to the socket and the substantial deformation or preloading of the elastomeric material and hence avoids the aforementioned "excess torque hysteresis" problem.

The polymeric bearing liner is mechanically interlocked with the socket. The ball portion of the ball stud slidingly engages the polymeric bearing liner for pivotal movement relative to the socket, and for transmitting loads between the ball stud and the socket. Since the elastomeric material does not completely surround the ball portion, a lesser effort is required to effect relative pivotal movement than is required in joints having the ball portion substantially surrounded with the elastomeric material.

The elastomeric material in the present invention is preferably preloaded somewhat in the direction of the bearing liner in order to provide for wear takeup in the event of wear between the ball portion of the ball stud and the polymeric bearing liner. Also, the socket member is preferably made up of stamped sheet metal parts, thus reducing the cost of the ball joint as compared to joints which do not utilize a socket made of stamped sheet metal parts. Further, the ball joint has grease reservoirs located within the bearing structure. These grease reservoirs are interconnected by grease grooves located in the polymeric bearing liner.

BRIEF DESCRIPTION OF THE DRAWINGS

Further objects and advantages of the present invention will become apparent to those skilled in the art to which the present invention relates from the following detailed description of the present invention made with reference to the accompanying drawings in which.

DETAILED DESCRIPTION

Figure 1:
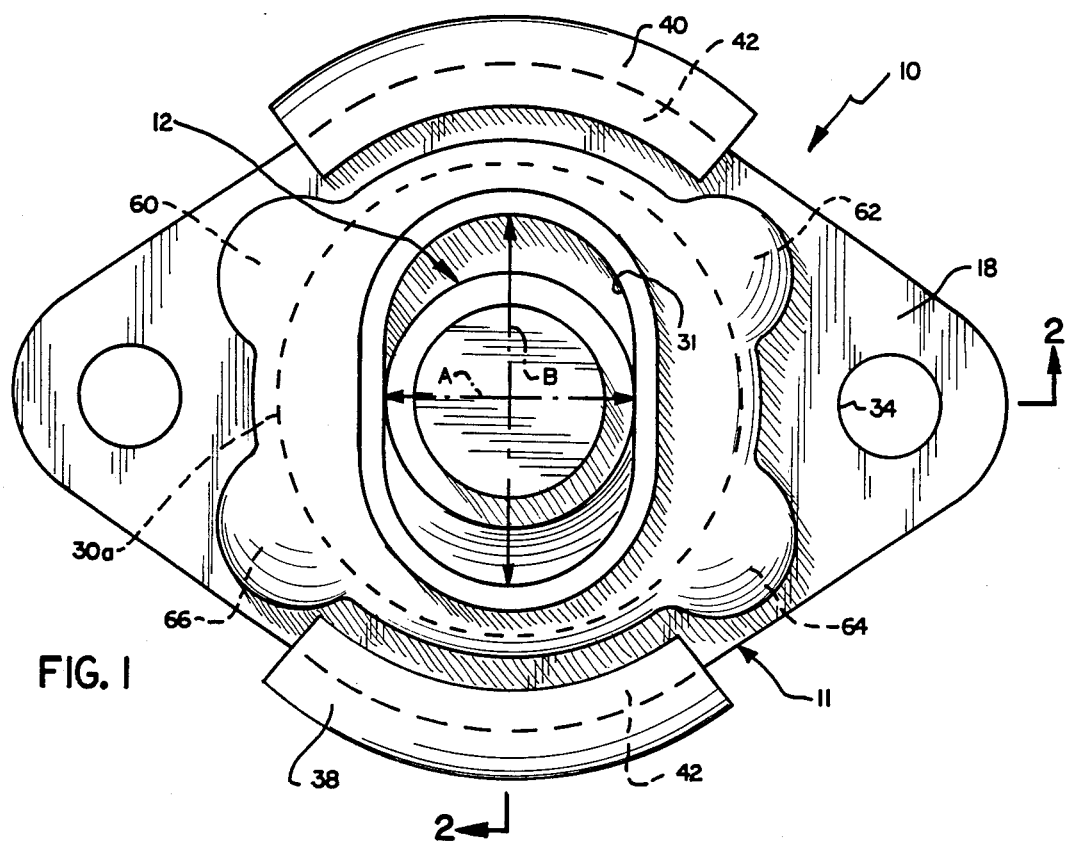
FIG. 1 is a top view of a ball joint embodying the present invention.

The present invention relates to a ball joint of improved construction and specifically to a ball joint which utilizes an elastomeric material bonded to the ball stud and interposed between the ball stud and the socket. The present invention is capable of many different constructions and uses. Specifically, the present invention is illustrated as applied to a ball joint 10 which is to be a part of a linkage assembly interposed between relatively movable members, such as chassis attachments and the wheel of an automobile.

Specifically, the ball joint 10 includes a socket member 11 and a ball stud member 12. The ball stud member 12 includes a shank portion 14 and a ball portion 15. The shank portion 14 is adapted to be connected with one of the relatively movable members, for example, to a member attached to a vehicle wheel.

The socket member 11 comprises two stamped sheet metal parts designated 18 and 20. The stamped sheet metal part 20 has a spherical portion 22 and an opening 23 in the bottom of the spherical portion 22. The sheet metal part 18 has a projecting portion 26 which is located vertically (as shown in the drawings) above the spherical portion 22 of the sheet metal part 20. The portion 26 of the sheet metal part 18 and the portion 22 of the sheet metal part 20 define a chamber 30 in which the ball stud 12 and specifically the ball portion 15 of the ball stud 12 is located. The sheet metal part 18 has an opening 31 therein and the shank portion 14 of the ball stud 12 extends through the opening 31. The portions 18 and 20 have respective aligned openings 34 and 36 which are adapted to receive bolts or rivets for securing the socket to the chassis attachments of the vehicle.

Also, the parts 18 and 20 have a crimped-over edge arrangement clamping the parts 18 and 20 together. Specifically, the sheet metal part 20 has opposite portions 38 and 40 which are crimped over a flange 42 of the part 18 to clamp the parts 18 and 20 together.

The opening 31, as best shown in FIG. 1, is oval in configuration. One dimension of the opening 31, indicated A in FIG. 1, is slightly larger than the diameter of ball stud shank 14. In the direction B perpendicular to dimension A, the opening 31 is substantially larger than the diameter of the ball stud shank 14. Thus, the ball stud shank 14 is constrained to limited movement in the direction A but free to oscillate over a substantially larger distance in the direction B. Also, the ball stud and socket may pivot relative to each other about the center of the ball portion 15 of the ball stud 12.

Figure 2:
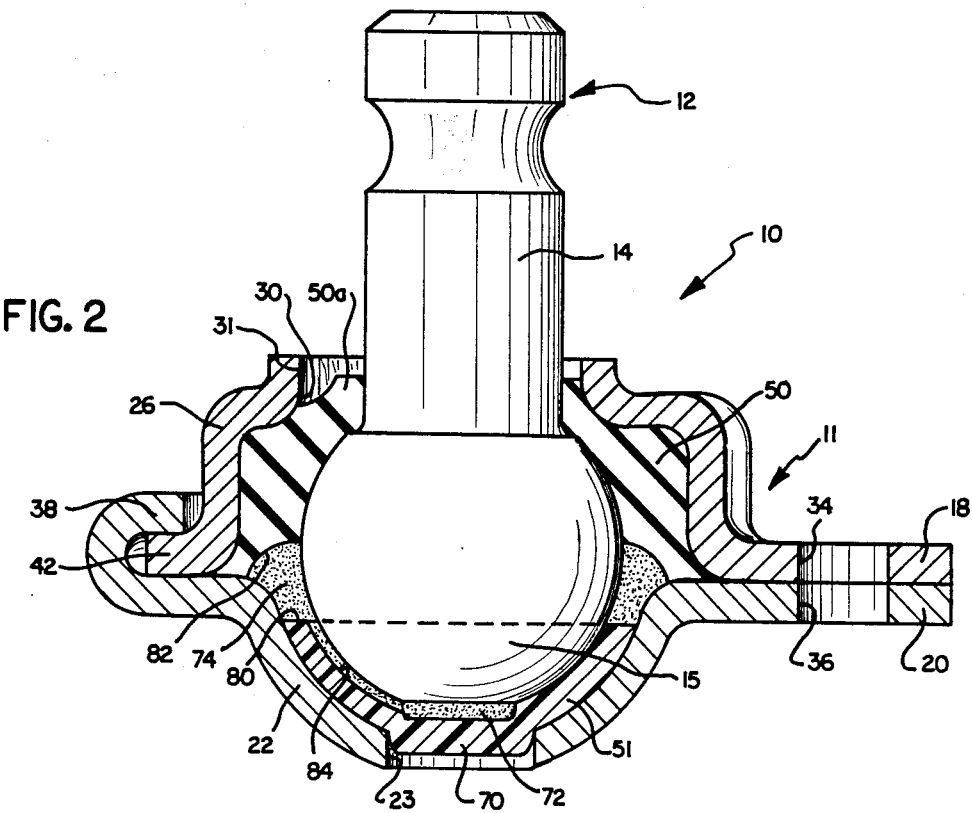
FIG. 2 is a cross sectional view taken approximately along the line 2—2 of FIG. 1.

A bearing arrangement is provided between the ball stud 12 and the socket 11. Specifically, this bearing arrangement includes an elastomeric bearing material 50 and a polymeric bearing liner 51. The bearing material 50 is bonded to a part of the ball portion 15. Specifically, the bearing material 50 is bonded to a part of the ball as shown in FIG. 2. The bearing material circumferentially encircles the ball portion 15. The bearing material 50 also has a projecting portion 50a which projects along the shank 14 of the ball stud 12 and the elastomeric material 50a is bonded to the shank 14.

The specific composition of a suitable elastomeric bearing material is known and may be the same composition as the elastomeric materials disclosed in the aforementioned U.S. patents. In general, as used herein "elastomer or elastomeric" means any rubber or rubber-like polymeric material. It is intended to include synthetic rubber, natural rubber, neoprene, butyl rubber, etc.

The elastomeric bearing material 50 is mechanically interconnected with the socket 11 to prevent slippage of the elastomeric bearing material 50 relative to the socket 11. The chamber 30 may be considered as divided into a central space or volume 30a and four spaces or volumes designated 60, 62, 64 and 66. The central volume 30a is circular in cross section and the volumes 60, 62, 66 and 66 project radially outwardly of the central volume 30a. Also, the volumes 60, 62, 64 and 66 are spaced circumferentially around the ball portion 15 and the central volume 30a. The bearing material 50 is located in the volumes 60, 62, 64 and 66 as well as in the volume 30a. Since the bearing material 50 is located in the volumes 60, 62, 64 and 66, the bearing material 50 cannot rotate relative to the socket 11. Specifically, the bearing material 50 is mechanically interconnected with the socket 11 and prevented from rotating or slipping relative to the socket 11. As a result, the process of bonding the elastomeric to the socket is avoided. Also, it is not necessary to substantially deform or preload the bearing material 50 against the surfaces of the socket 11.

The polymeric bearing member 51 is a cup-shaped bearing and is located in the spherical portion 22 of the socket 11. The bearing member 51 has a pilot portion 70 which is located in the opening 23 in the sheet metal part 20. This properly locates the bearing member 51 and prevents movement thereof in the socket 11. The shape of the pilot portion 70 is such that it will provide the resistance needed to keep the bearing liner in position during oscillation and rotation of the ball. The specific shape of this pilot 70 is optional. Alternatively, the bearing liner 51 may have projecting portions which are located in recesses in the socket part 22 and which resist rotation of the bearing liner relative to the socket part 22.

In the illustrated embodiment, the bearing member 51 has a surface portion which corresponds to the internal surface of the portion 22 and rests on the internal surface of the portion 22. Also, the bearing 51 has a surface portion which is engaged by the ball portion 15 of the ball stud 12. As a result of this construction, the ball portion 15 slides on the inner surface of the bearing member 51.

In view of the fact that the ball joint of the present invention does not have the elastomeric material 50 surrounding the ball portion 15 entirely, a lesser effort is required to cause relative pivotal movement of the ball stud 12 and socket 11 than is required in ball joints that utilize the same elastomeric material entirely surrounding the ball portion. Also, since the ball portion 15 directly engages the bearing liner 51, vertical forces between the socket 11 and ball stud 12 are transmitted directly to the socket 11 rather than through the elastomeric bearing material as in the case where the bearing material completely surrounds the ball stud. Thus, the use of the bearing liner 51 enables loads to be carried which may not be possible with fully elastomeric bearing designs.

Further, the ball joint 10 includes grease reservoirs 72 and 74. The grease reservoir 72 is located between the pilot portion 70 of the plastic bearing liner 51 and the ball portion 15 of the ball stud 12. The grease reservoir 74 is an annular chamber which extends around the ball stud 12 near the equator of the ball portion 15. Specifically, the grease reservoir 74 is located between the upper edge 80 of the bearing liner 51 and the lower edge 82 of the elastomeric bearing layer 50. A plurality of grease grooves 84, only one of which is shown in the drawings, are formed on the inner surface of the bearing liner 51. These grease grooves provide for a flow of grease between the reservoirs 72 and 74 and between the bearing liner 51 and the ball portion 15 of the ball stud 12. Specifically, displacement of the elastomeric material during ball stud motion relative to the socket will produce a local reduction of the reservoir size thus displacing or moving the grease through the grooves in the bearing liner 51. This will produce a continual movement of the grease that will keep the mating bearing surfaces lubricated with a "fresh" supply of grease from the reservoirs.

The ball joint of the present invention is preferably assembled by first bonding the elastomeric material 50 to the ball stud 12. The bearing lining 51 is located in the portion 22 of the socket part 20. Grease is then applied to the grease reservoirs 70, 72. The part 18 of the socket is located adjacent the other parts and the ball stud 12 is located in the chamber 30. The parts 18, 20 are pressed together and the portions 38, 40 are crimped against the flange 42 to join parts 18, 20. During the joining of parts 18 and 20, the material 50 is displaced into the volumes 60, 62, 64 and 66. This causes a preload of the elastomeric bearing material and provides the mechanical interlock of the bearing material 50 to the socket 11.

Having described my invention, I claim:

1. A ball and socket joint for use between load bearing members which pivot relative to each other,
    said ball and socket joint including a ball stud for connection with one member and a socket for connection with the other member,
    said ball stud including a ball portion and a shank portion projecting from said ball portion,
    said socket having a chamber in which said ball portion is located and an opening through which said shank portion projects,
    a cup-shaped polymeric bearing liner interposed between a first part of said ball portion and said socket for transmitting forces and enabling sliding movement to occur therebetween, and
    an elastomeric layer bonded to a second part of said ball portion and resiliently interconnecting said ball stud and socket and urging said ball stud and socket to an initial relative position,
    said elastomeric layer having portions which project into volumes defined by said socket to mechanically interlock said elastomeric layer and socket and prevent slipping of said elastomeric layer relative to said socket.

2. A joint as defined in claim 1 wherein said chamber has a central portion which is circular in cross section and said volumes into which said elastomeric layer projects are located radially outwardly of said central portion and are spaced circumferentially around said socket.

3. A joint as defined in claim 1 or 2 further including one grease reservoir located between said bearing liner and said elastomeric layer and said bearing liner having a groove in the cup-shaped surface thereof communicating with said one grease reservoir.

4. A joint as defined in claim 3 wherein said one grease reservoir comprises an annular chamber surrounding said ball portion near the equator of said ball portion and further including a second grease reservoir located between said ball portion and said bearing liner and which also communicates with said groove.

5. A joint as defined in claim 1 wherein said socket comprises a pair of sheet metal housing parts, said sheet metal housing parts having portions which are crimped together.

6. A ball and socket joint for connecting load bearing members for relative pivotal movement, said ball and socket joint comprising:
    a ball stud for connection with one member, said ball stud including a ball portion and a shank portion extending therefrom;
    a socket for connection with the other member, said socket having a surface defining chamber in which said ball portion is disposed and an opening through which said shank portion extends;
    a deformable elastomeric layer bonded to a first part of said ball portion and resiliently interconnecting said ball stud and said socket for urging said ball stud to an initial position relative to said socket;
    a polymeric bearing liner disposed between a second part of said ball portion and said socket for transmitting loads therebetween and enabling sliding movement to occur therebetween, said polymeric bearing liner being disposed in said socket opposite said shank portion which extends from said ball portion; and
    said socket further including at least a second opening therein for receiving a portion projecting from said polymeric bearing liner to position said polymeric bearing liner relative to said socket.

7. A joint as set forth in claim 6 wherein said second opening and said portion projecting from said polymeric bearing liner have surfaces which cooperate to resist rotational and circumerential movement of said polymeric bearing liner relative to said socket.

8. A joint as set forth in claim 7 further including one grease reservoir located between said polymeric bearing liner and said elastomeric layer, and said polymeric bearing liner having a groove in the surface thereof communicating with said one grease reservoir.

9. A joint as set forth in claim 8 wherein said one grease reservoir comprises an annular chamber surrounding said ball portion near the equator of said ball portion and further including a second grease reservoir located between said ball portion and said polymeric bearing liner and which also communicates with said groove.

* * * * *